US012188287B2

(12) United States Patent
Kadam et al.

(10) Patent No.: US 12,188,287 B2
(45) Date of Patent: Jan. 7, 2025

(54) AUTOMATED DOOR FOR COUNTERTOP OVEN

(71) Applicant: WHIRLPOOL CORPORATION, Benton Harbor, MI (US)

(72) Inventors: Suraj Narendra Kadam, Pune (IN); Vishal Shankar Marathe, Pune (IN); Mahalingappa Chudamani Mulimani, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 459 days.

(21) Appl. No.: 17/494,280

(22) Filed: Oct. 5, 2021

(65) Prior Publication Data

US 2023/0105301 A1 Apr. 6, 2023

(51) Int. Cl.
*F24C 15/02* (2006.01)
*E05F 15/73* (2015.01)

(52) U.S. Cl.
CPC ............ *E05F 15/73* (2015.01); *F24C 15/023* (2013.01); *E05Y 2900/308* (2013.01)

(58) Field of Classification Search
CPC ... E05F 15/73; F24C 15/023; E05Y 2900/308
See application file for complete search history.

(56) References Cited

U.S. PATENT DOCUMENTS 7,755,004 B2 7/2010 Collene et al.
8,710,409 B2 4/2014 Busalt et al.
10,226,161 B2 3/2019 Gerstner et al.
10,301,866 B2 5/2019 Margonari et al.
10,712,017 B2 7/2020 Buchmann et al.
2003/0172920 A1 9/2003 Gronbach
2007/0267402 A1 11/2007 Harned et al.
2014/0327353 A1* 11/2014 Seo .......................... E05D 7/00
49/31

(Continued)

FOREIGN PATENT DOCUMENTS

DE 4019411 A1 12/1991
DE 102006029902 A1 1/2016

(Continued)

OTHER PUBLICATIONS

Nevon Project, Motion Based Automatic Door Opener, YouTube Video dated Jun. 25, 2015, https://www.youtube.com/watch?v=B3wuNOUBcIE (accessed on Oct. 5, 2021).

*Primary Examiner* — Alfred Basichas
(74) *Attorney, Agent, or Firm* — Price Heneveld LLP

(57) ABSTRACT

A cooking appliance includes a body and a door assembly coupled to the body. The door assembly includes a frame and a door, which is operable between an opened position and a closed position. A first adjustment assembly is coupled to a first side of the door. A second adjustment assembly is coupled to a second side of the door. Each of the first and second adjustment assemblies includes a support structure coupled to the frame and which defines a slot. A link arm is coupled to an interior surface of the door and includes a projection that extends through the slot. A motor is operably coupled to the door. A controller is configured to activate at least one of the first and second adjustment assemblies to guide the door between the opened position and the closed position.

20 Claims, 16 Drawing Sheets

(56) References Cited

U.S. PATENT DOCUMENTS

| | | | |
|---|---|---|---|
| 2019/0306932 | A1 | 10/2019 | Shin et al. |
| 2020/0141173 | A1 | 5/2020 | Himmelein et al. |

FOREIGN PATENT DOCUMENTS

| | | | |
|---|---|---|---|
| DE | 102015115573 | A1 | 3/2017 |
| EP | 1898156 | A1 | 3/2008 |
| GB | 2350863 | A | 5/2001 |
| KR | 970011179 | B1 | 7/1997 |
| KR | 20060062226 | A | 6/2006 |
| WO | 2019057125 | A1 | 9/2018 |

* cited by examiner

AUTOMATED DOOR FOR COUNTERTOP OVEN

BACKGROUND OF THE DISCLOSURE

The present disclosure generally relates to a door for an oven, and more specifically, to an automated door for a countertop oven.

SUMMARY OF THE DISCLOSURE

According to one aspect of the present disclosure, a cooking appliance includes a body defining an inner cavity. A door assembly is coupled to the body. The door assembly includes a frame. A door is rotatably coupled to the frame. The door is operable between an opened position and a closed position. A first adjustment assembly is coupled to a first side of the door assembly. A second adjustment assembly is coupled to a second side of the door assembly. Each of the first adjustment assembly and the second adjustment assembly includes a support structure coupled to an inner surface of the frame and defining a slot. A link arm includes a projection. The link arm is coupled to an interior surface of the door and the projection extends through the slot. A motor is operably coupled to the door. A controller is in communication with the first adjustment assembly and the second adjustment assembly. The controller is configured to activate the at least one of the first adjustment assembly and the second adjustment assembly to guide the door between the opened position and the closed position.

According to another aspect of the present disclosure, a door assembly for a countertop cooking appliance includes a frame defining an opening. A door is rotatably coupled to the frame and operable about a rotational axis between an opened position and a closed position for selectively accessing the opening. A support structure is coupled to an inner surface of the frame. The support structure defines a slot having a proximal end and a distal end. A link arm is rotatably coupled to an interior surface of the door. The link arm includes a projection extending through the slot. A cap is coupled to the projection on an opposing side of the support structure relative to the link arm. A motor is coupled to the door proximate to the rotational axis. A controller is in communication with the motor. The controller is configured to activate the motor to rotate the door. Movement of the door is guided by the projection traveling along the slot between the proximal end and the distal end.

According to yet another aspect of the present disclosure, a method for adjusting an appliance door includes activating a countertop appliance and sensing an activation signal within a sensing field to adjust a door. The activation signal is at least one of a presence, a gesture, and a voice command. The method also includes determining a current position of the door; activating at least one motor to adjust the door to a subsequent position different than the current position and guiding the door by moving a projection of a link arm from along a slot defined in a support structure. The projection is configured to move from one end of the slot to an opposing end of the slot to control movement of the door.

These and other features, advantages, and objects of the present disclosure will be further understood and appreciated by those skilled in the art by reference to the following specification, claims, and appended drawings.

Figure 1:
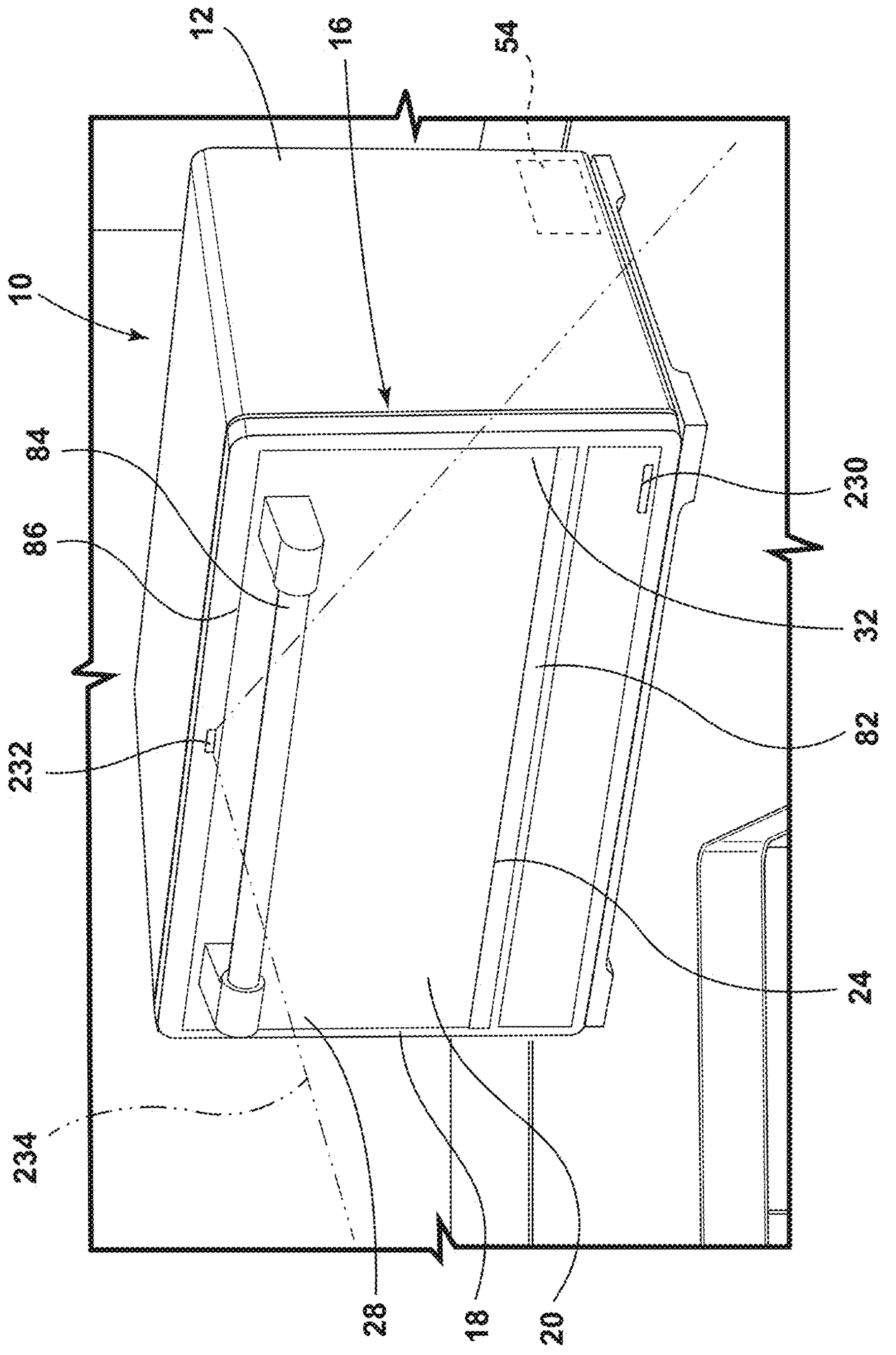
FIG. 1 is a front perspective view of a countertop cooking appliance, according to the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to an automated door for a countertop oven. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

With reference to FIGS. 1-19, reference numeral 10 generally designates a cooking appliance including a body 12 that defines an inner cavity 14. A door assembly 16 is coupled to the body 12 and includes a frame 18 and a door 20 rotatably coupled to the frame 18. The door 20 is operable between an opened position 22 and a closed position 24. A first adjustment assembly 26 is coupled to a first side 28 of the door assembly 16 and a second adjustment assembly 30 is coupled to the second side 32 of the door assembly 16. Each of the first adjustment assembly 26 and the second adjustment assembly 30 includes a support structure 34, 36, respectively, coupled to an inner surface 38 of the frame 18. The support structures 34, 36 each define a slot 40*a*, 40*b*. The first and second adjustment assemblies 26, 30 each include a link arm 42, 44 that has a projection 46. The link arms 42, 44 are coupled to an interior surface 48 of the door 20. Each projection 46 extends through the respective slot 40*a*, 40*b*. Each of the first and second adjustment assemblies 26, 30 also includes a motor 50, 52 operably coupled to the door 20. A controller 54 is in communication with each of the first adjustment assembly 26 and the second adjustment assembly 30. The controller 54 is configured to activate at least one of the first and second adjustment assemblies 26, 30 to guide the door 20 between the opened position 22 and the closed position 24.

Figure 3:
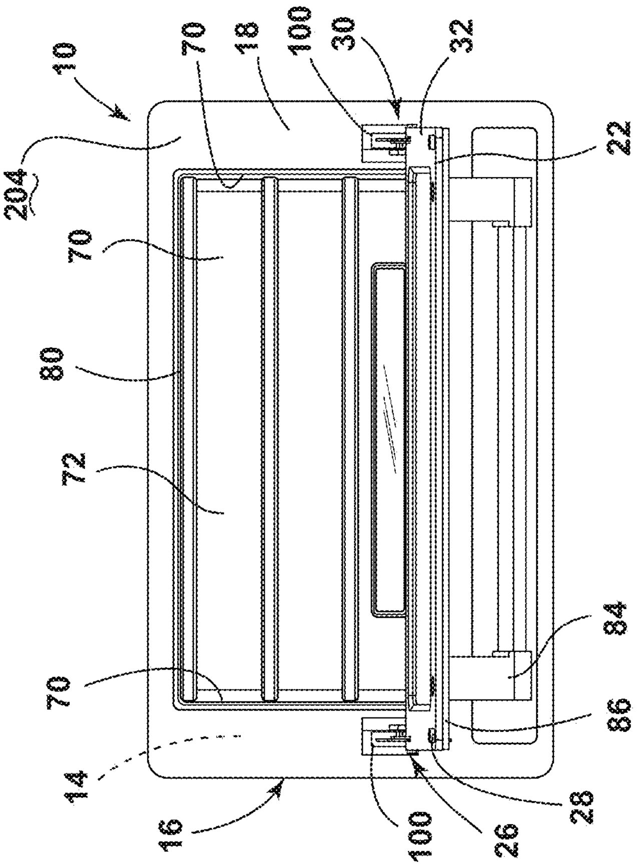
FIG. 3 is a front elevation view of a countertop cooking appliance with a door in an opened position, according to the present disclosure.
Figure 2:
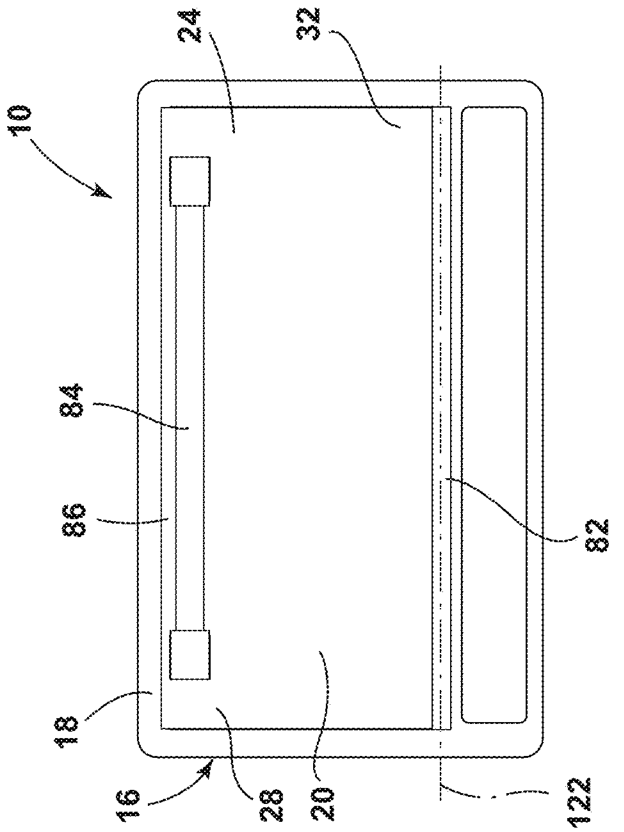
FIG. 2 is a front elevation view of a countertop cooking appliance with a door in a closed position, according to the present disclosure.

With reference to FIGS. 1-3, the cooking appliance 10 includes the body 12 that defines the inner cavity 14. Within the inner cavity 14, walls 70 are positioned to define a cooking cavity 72 for cooking a food item. The cooking cavity 72 is generally a portion of the inner cavity 14, such that there is space between the walls 70 and the body 12. Multiple components, such as the adjustment assemblies 26, 30 may be at least partially disposed within this space to be substantially obscured from view.

The cooking appliance 10 includes the frame 18, which is configured as a front of the cooking appliance 10. The frame 18 defines an opening 80 for accessing the cooking cavity 72 within the cooking appliance 10. The frame 18 also substantially prevents access into the space between the cooking cavity 72 and the body 12.

The door 20 is rotatably coupled to the frame 18 and operates to allow selective access to the cooking cavity 72. In the example illustrated in FIGS. 1-3, the door 20 has a height that is less than a height of the frame 18, such that a lower edge 82 of the door 20 is spaced from a bottom of the cooking appliance 10. This configuration may provide space for internal components, such as heating elements below the cooking cavity 72, a removable tray, or a storage area. Other configurations of the door 20 relative to the body 12 are contemplated without departing from the teachings herein.

Additionally, the door 20 has a width that overlaps with the frame 18 to completely cover the opening 80 when the door 20 is in the closed position 24. The overlapping configuration may be advantageous for providing the adjustment assemblies 26, 30 within the inner cavity 14 and engaging the door 20 through the frame 18.

In the illustrated example of FIGS. 1-3, a handle 84 is coupled to the door 20 along an upper edge 86 thereof. The handle 84 allows a user to manually adjust the door 20 between the raised, closed position 24 and the lowered, opened position 22. It is contemplated that the door 20 may be manually rotated and/or automated to provide a hands-free option for the door 20.

Referring still to FIGS. 1-3, the adjustment of the door 20 may be substantially or entirely automated through the adjustment assemblies 26, 30. The adjustment assemblies 26, 30 operate to move and guide the door 20 between opened and closed positions 22, 24. The frame 18 defines smaller apertures 100 on opposing sides of the opening 80. The adjustment assemblies 26, 30 extend from the inner cavity 14 and through the apertures 100 to engage the door 20.

As illustrated in FIGS. 1-3, the cooking appliance 10 is a countertop cooking appliance 10 or countertop oven. It is contemplated that the cooking appliance 10 may be any cooking unit that has a door 20 operable between opened and closed positions 22, 24, including, but not limited to, built-in ovens, freestanding ovens, slide-in ovens, microwave ovens, etc. Additionally, it is also contemplated that the adjustment assemblies 26, 30 may be utilized with other appliances, such as refrigerated appliances, dish appliances, other countertop appliances, other home and commercial appliances, etc.

Figure 4:
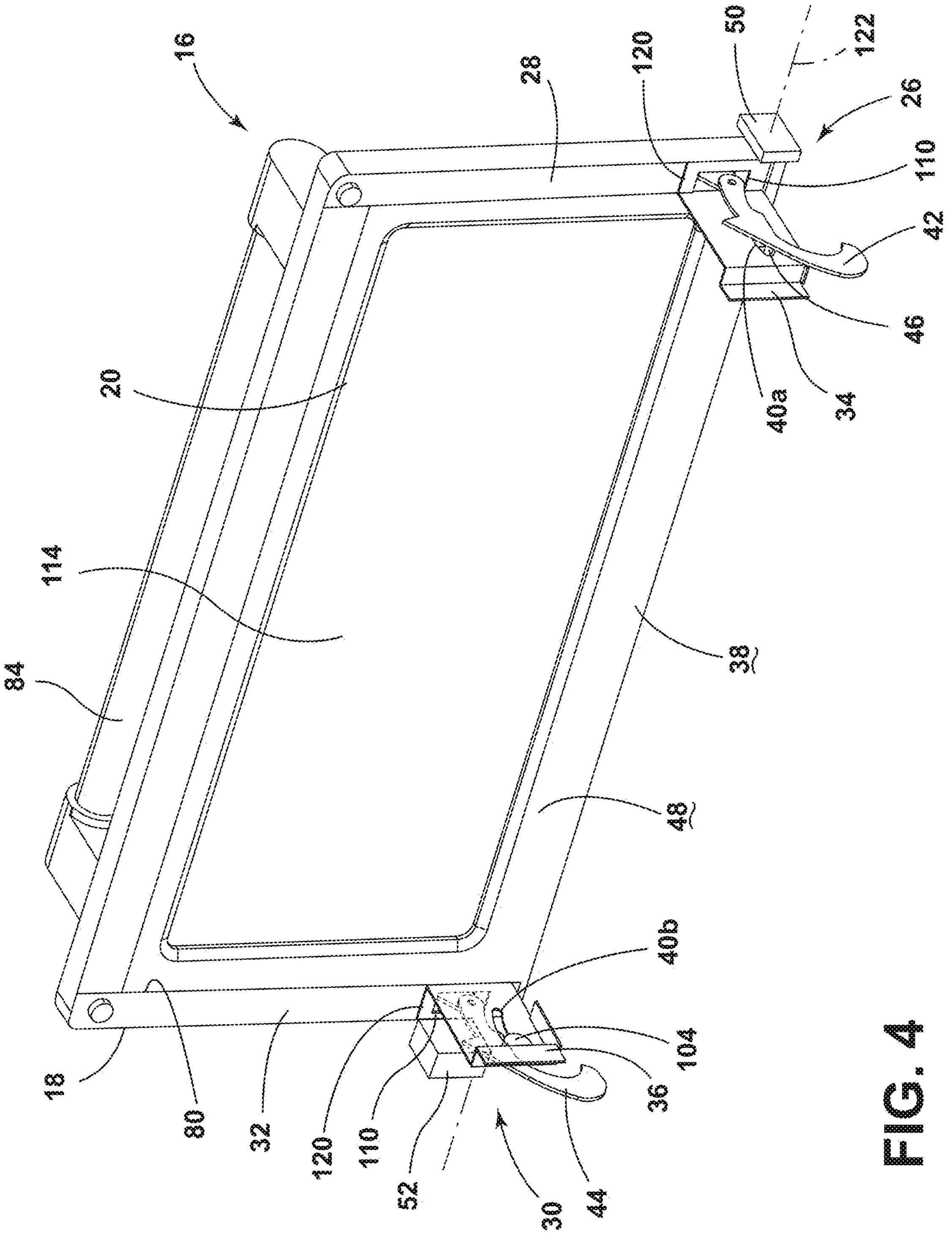
FIG. 4 is a rear perspective view of a door assembly for a countertop cooking appliance, according to the present disclosure.

With reference still to FIG. 3 and now to FIG. 4, the first adjustment assembly 26 is coupled to the first side 28 of the door assembly 16, and the second adjustment assembly 30 is coupled to the second side 32 of the door assembly 16. The adjustment assemblies 26, 30 engage the door 20 proximate to the lower edge 82 thereof and the frame 18 proximate to the apertures 100. As illustrated, the first and second sides 28, 32 are lateral sides, and the door 20 raises and lowers between the opened and closed positions 22, 24.

In this way, the door 20 is guided on both sides 28, 32, allowing for more uniform movement of the door 20, which may also reduce any twisting effect. In other configurations of the cooking appliance 10, the adjustment assemblies 26, 30 may engage the upper edge 86 or a side edge of the door 20 to provide automated movement along different movement paths (e.g., raise to open, swing open, etc.).

Each adjustment assembly 26, 30 includes the support structure 34, 36, the link arm 42, 44, the motor 50, 52, and a retaining cap 102, 104, respectively. As best illustrated in FIG. 4, the support structures 34, 36 are coupled to the inner surface 38 of the frame 18, which faces the inner cavity 14 of the body 12. The support structures 34, 36 are generally stationary, internal components that are substantially obscured from view. The support structures 34, 36 each define an aperture 110, which align with the apertures 100 of the frame 18, respectively. The link arms 42, 44 extend through the apertures 110 of the support structures 34, 36 and the apertures 100 of the frame 18 to engage the door 20.

Figure 5:
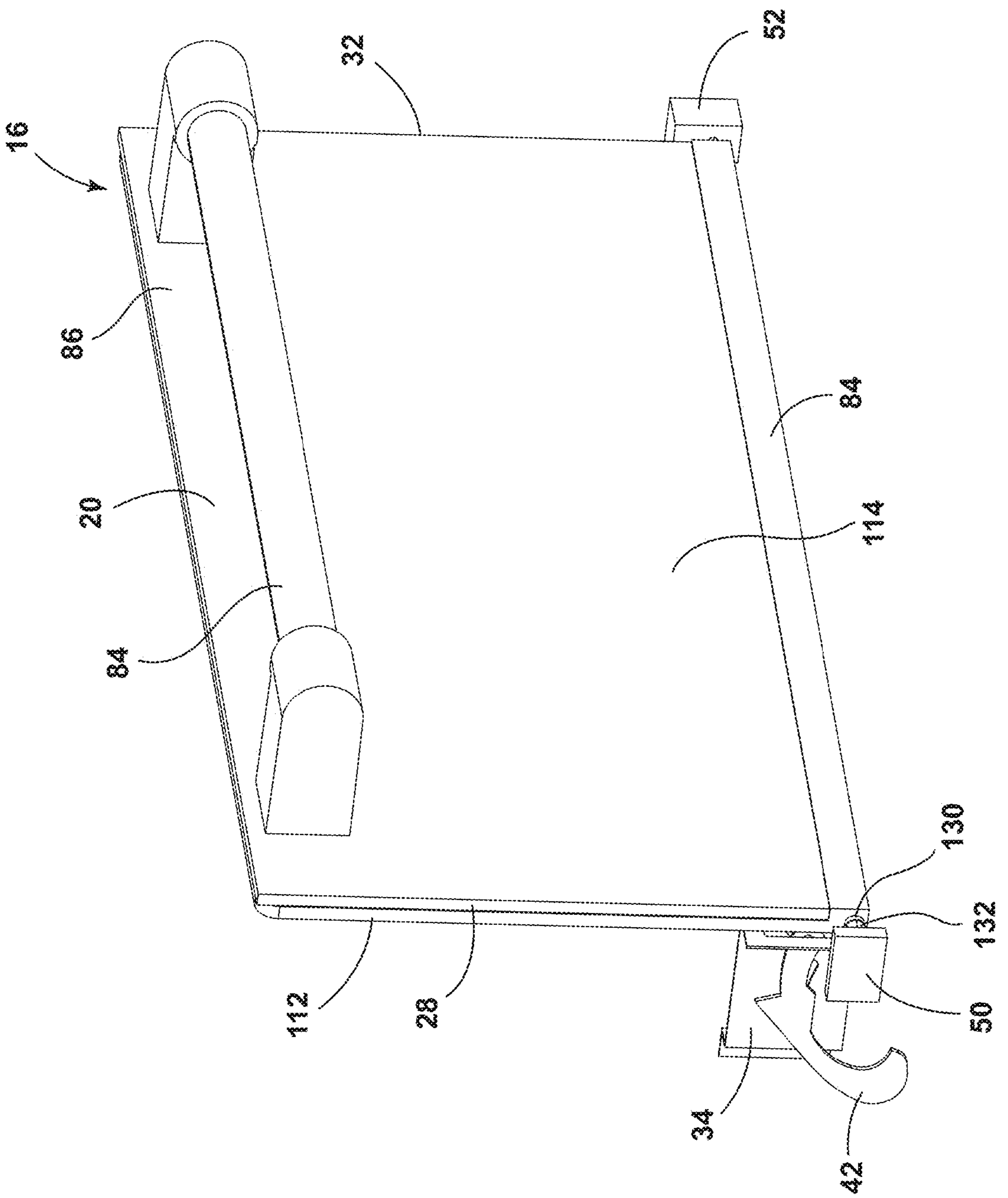
FIG. 5 is a side perspective view of a door assembly for a countertop cooking appliance with a frame removed, according to the present disclosure.
Figure 6:
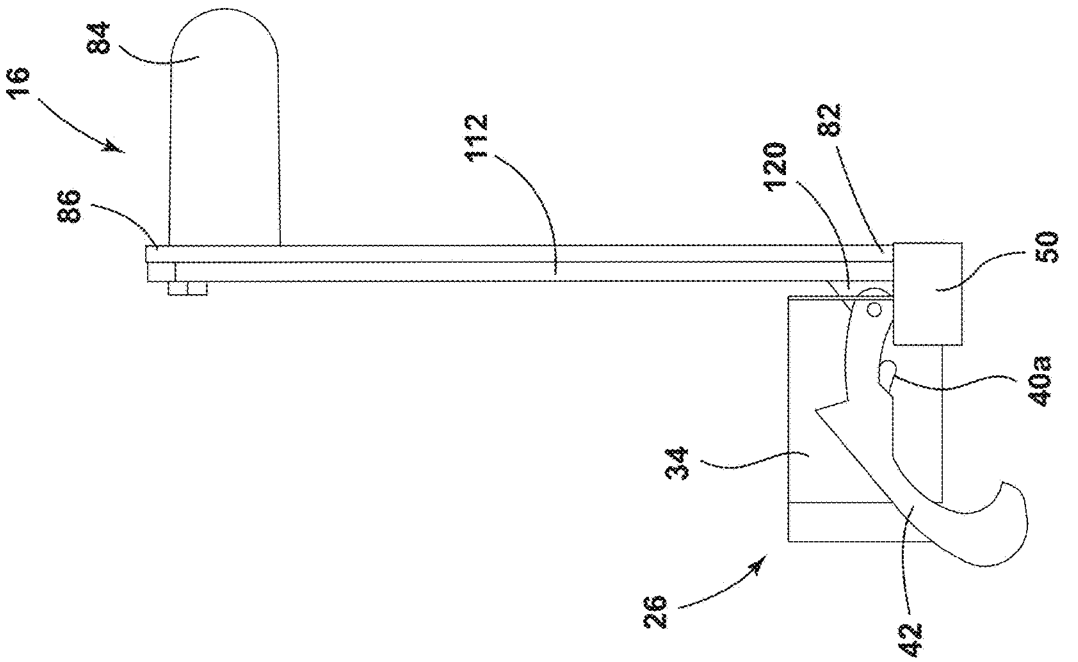
FIG. 6 is a side elevation view of a door assembly for a countertop cooking appliance with a frame removed, according to the present disclosure.
Figure 7:
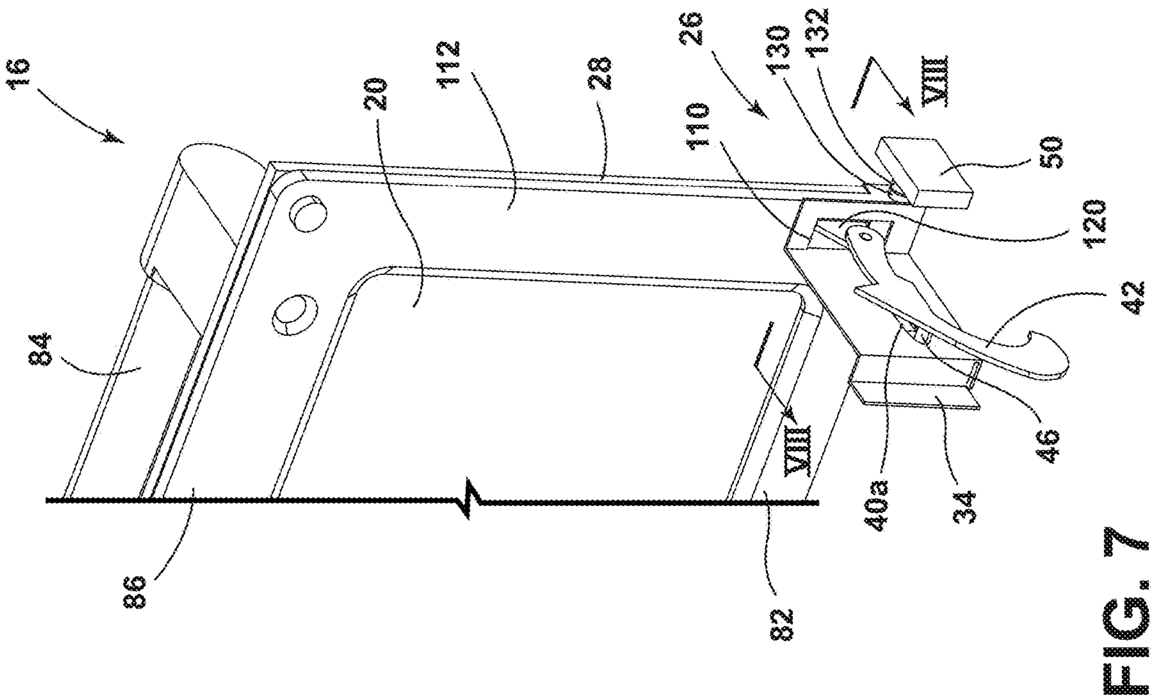
FIG. 7 is a partial rear perspective view of a door assembly for a countertop cooking appliance with a frame removed, according to the present disclosure.

With reference to FIGS. 5-7, the first adjustment assembly 26 is illustrated in more detail coupled to the door 20. The adjustment assemblies 26, 30 may be mirror images of one another and any description of the structure and function of the first adjustment assembly 26 and components thereof is generally applicable to the second adjustment assembly 30. The second adjustment assembly 30 works in a similar manner as the first adjustment assembly 26, but in a mirrored configuration. The door 20 may have a door frame 112 that provides structural support for the door 20. Additionally or alternatively, the door frame 112 may support attachment locations for various components onto the door 20, such as the handle 84 and the adjustment assemblies 26, 30. A central portion 114 of the door 20 may define a transparent portion, allowing the user to view the cooking cavity 72 when the door 20 is in the closed position 24.

In various examples, the adjustment assemblies 26, 30 provide both guiding aspects and driving aspects to the door 20. In the illustrated example of the first adjustment assembly 26, the support structure 34 assists in guiding the movement of the door 20. The support structure 34 is coupled to the inner surface 38 of the frame 18. The support structure 34 extends into the inner cavity 14 from the frame 18, away from the door 20. The support structure 34 may be configured to engage additional structural or internal features within the inner cavity 14 to provide support for the door 20.

The support structure 34 is engaged with the link arm 42. The link arm 42 is positioned on an outer side of the support structure 34 such that the link arm 42 is disposed between the support structure 34 and the body 12 of the cooking appliance 10. The link arm 42 is rotatably coupled to the door 20. The door 20 includes a flange 120 that extends from the interior surface 48 thereof. The flange 120 couples with the link arm 42 and is configured to rotate relative to the link arm 42 as the door 20 moves between the opened and closed positions 22, 24.

With reference still to FIGS. 5-7, the adjustment assembly 26 includes the motor 50, which assists in driving the movement of the door 20. The motor 50 is positioned within the inner cavity 14. Generally, the motor 50 is coupled to the door 20 along a rotational axis 122. The door 20 includes a pin 130 proximate to the lower edge 82 on each of the first and second sides 28, 32 thereof. The motor 50 is configured to engage the pin 130 to drive movement of the door 20 about the rotational axis 122. In various examples, the motor 50 includes a driveshaft 132, which couples with the pin 130 and consequently drives the movement of the door 20.

Figure 9:
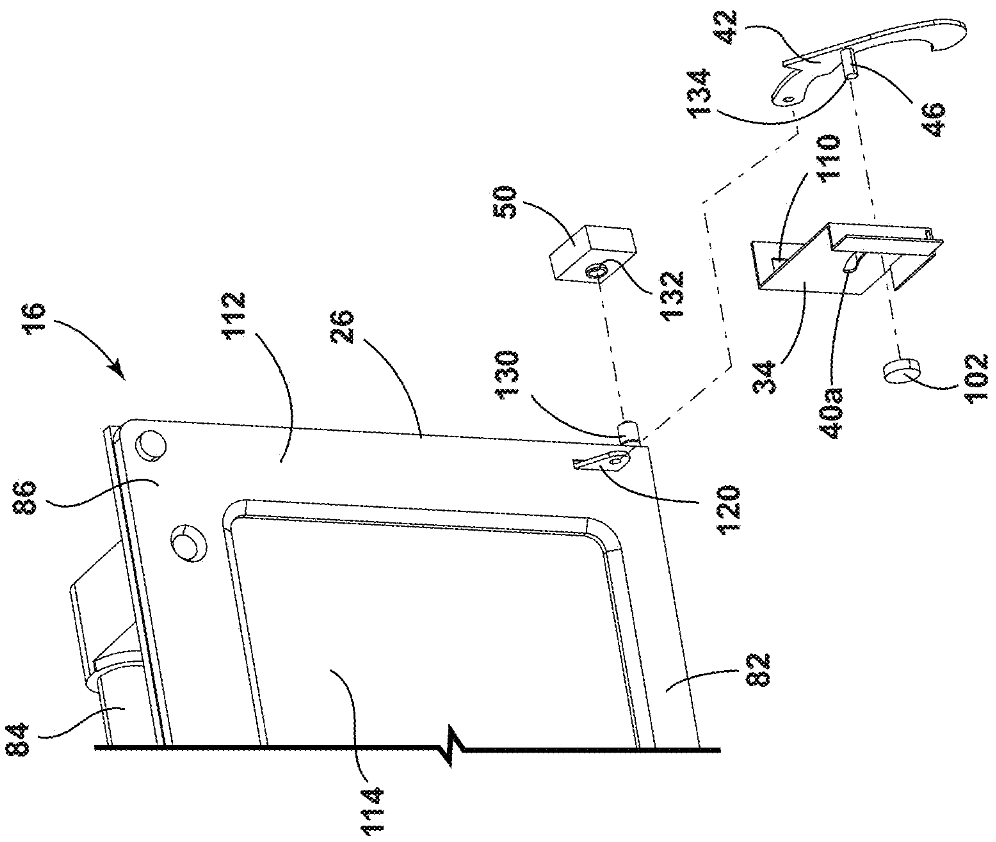
FIG. 9 is a partial exploded rear perspective view of a door assembly, according to the present disclosure.
Figure 8:
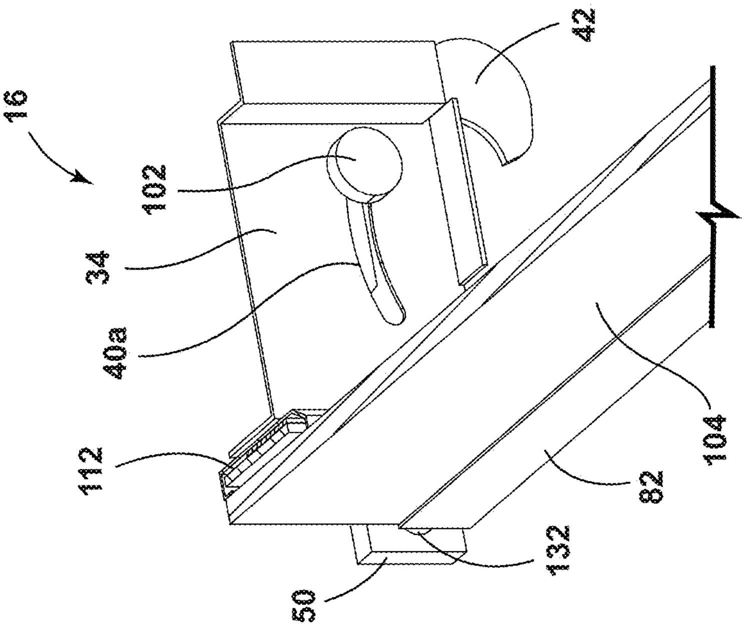
FIG. 8 is a partial cross-sectional front perspective view of an adjustment assembly for the door assembly of FIG. 7, taken along line VIII-VIII, according to the present disclosure.

Referring to FIGS. 8 and 9, the link arm 42 includes the projection 46 extending toward and through the support structure 34. The support structure 34 defines the slot 40*a*, which extends into the inner cavity 14 (e.g., perpendicular to the frame 18). The projection 46 extends through the slot 40*a* defined by the support structure 34 and the retaining cap 102 engages an end 134 of the projection 46. The retaining cap 102 is disposed on an opposing side of the link arm 42 relative to the retaining cap 102. The engagement between the retaining cap 102 and the projection 46 maintains the engagement between the link arm 42 and the support structure 34 as the door 20 moves between the opened and closed positions 22, 24.

Figure 10:
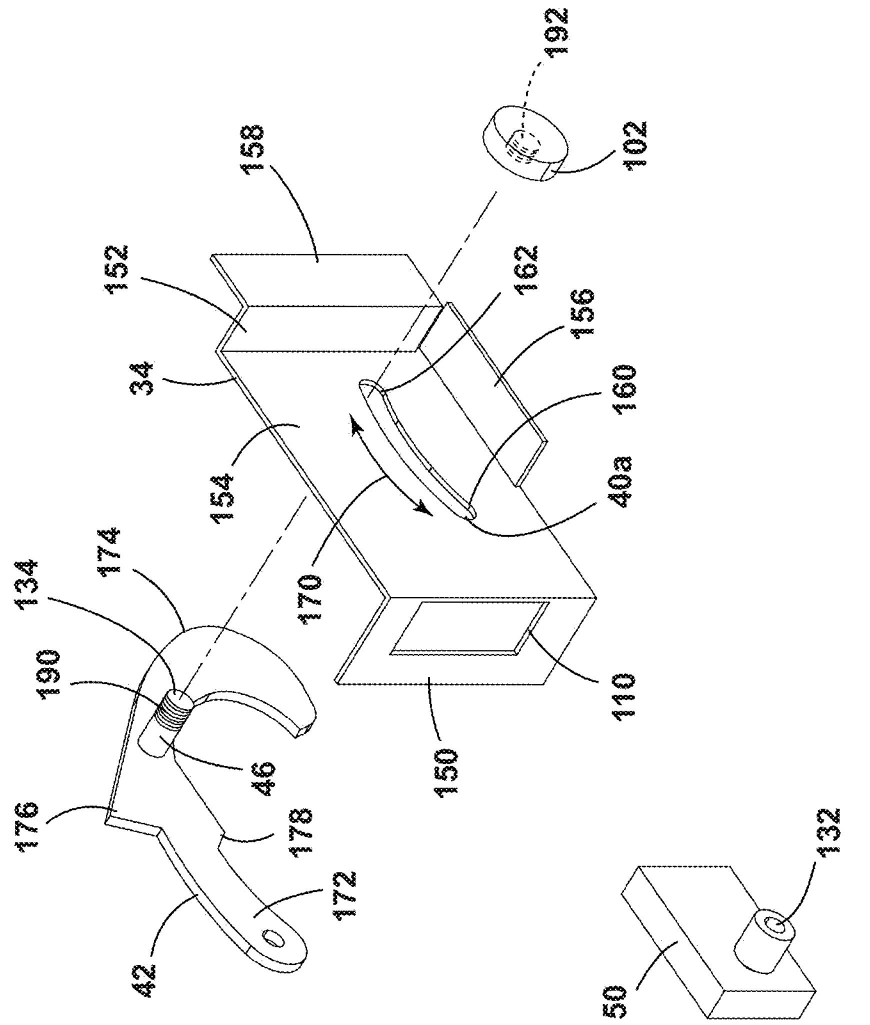
FIG. 10 is an exploded side perspective view of an adjustment assembly for a door assembly of a countertop appliance, according to the present disclosure.

Referring now to FIG. 10, the support structure 34 includes a first end portion 150 configured to couple to the inner surface 38 of the frame 18, a second end portion 152 spaced from the first end portion 150, and a guide plate 154 extending therebetween. The first and second end portions 150, 152 may extend parallel to one another, while the guide plate 154 extends perpendicular to each end portion 150, 152. Further, the end portions 150 may extend in opposing directions from opposing ends of the guide plate 154.

A base extension 156 extends from a bottom edge of the guide plate 154. The base extension 156 extends along a portion of the length of the guide plate 154 and extends toward a center of the cooking appliance 10. The base extension 156 extends in a same direction (e.g., toward the cooking cavity 72) from the guide plate 154 as the second end portion 152.

The support structure 34 also includes a side extension 158, which extends from the second end portion 152. The side extension 158 extends parallel to the guide plate 154, away from the base extension 156. As illustrated in FIG. 10, the second end portion 152 and the base extension 156 extend a similar distance from the guide plate 154. The side extension 158 is generally aligned with an outer edge of the base extension 156.

Referring still to FIG. 10, the guide plate 154 defines the slot 40*a* through which the projection 46 extends. The slot 40*a* extends from a proximal end 160 proximate to the first end portion 150 to a distal end 162 proximate to the second end portion 152. The slot 40*a* defines a curved shape or a curved guide path 170 for guiding the projection 46. The curved guide path 170 is generally parabolic in shape, defining a concave curve relative to a base extension 156 of the support plate. Other shapes of the slot 40*a* may be utilized depending on the movement of the door 20.

The link arm 42 has a generally curved or hook-shaped configuration. The link arm 42 may extend and travel generally parallel with the guide plate 154. In the illustrated example of FIG. 10, the link arm 42 has a coupling portion 172 that engages the door 20 and a guide portion 174 that engages the support structure 34. The coupling portion 172 has a smaller height, which may be advantageous for moving through the apertures 110 of the support structure 34, 36 and the frame 18, respectively.

The guide portion 174 has increased height relative to the coupling portion 172, which may provide additional support for the engagement with the support structure 34. The guide portion 174 also includes vertical protrusions 176, 178 extending from the guide portion 174 proximate to the coupling portion 172. The vertical protrusions 176, 178 increase the height of the guide portion 174. The guide portion 174 defines a greater curve than the coupling portion 172. The shape of the link arm 42 may be at least partially based on the movement of the door 20 to assist in guiding smoother movement of the door 20.

Referring still to FIG. 10, the link arm 42 is illustrated. It is understood that the link arm 44 works similarly but in a mirrored configuration. The link arm 42 extends through the support structure 34 at two locations. The link arm 42 extends through the aperture 110 of the support structure 34 to engage the door 20 and through the slot 40*a* to engage the retaining cap 102. The projection 46 of the link arm 42 extends from a central location on the link arm 42 and through the slot 40*a*. The central location is generally proximate to the vertical protrusions 176, 178.

The projection 46 is configured to move between the proximal end 160 and the distal end 162 of the slot 40*a* to guide the movement of the door 20. The projection 46 defines threads 190, which are configured to engage mating threads 192 defined by the retaining cap 102. Other mating structures other than threads 190, 192 may be utilized without departing from the teachings herein. The engagement between the retaining cap 102 and the projection 46 may maintain the engagement between the link arm 42 and the support structure 34, 36. Further, this engagement may maintain a select distance or range of distances between the link arm 42 and the support structure 34 as the link arm 42 moves.

In the illustrated example of FIG. 10, the retaining cap 102 is positioned on a same side of the support structure 34 as the base extension 156. This may be an interior side proximate to the cooking cavity 72. The retaining cap 102 is configured to couple to the end 134 of the projection 46 and retain the projection 46 within the slot 40*a* of the support structure 34.

Figure 11:
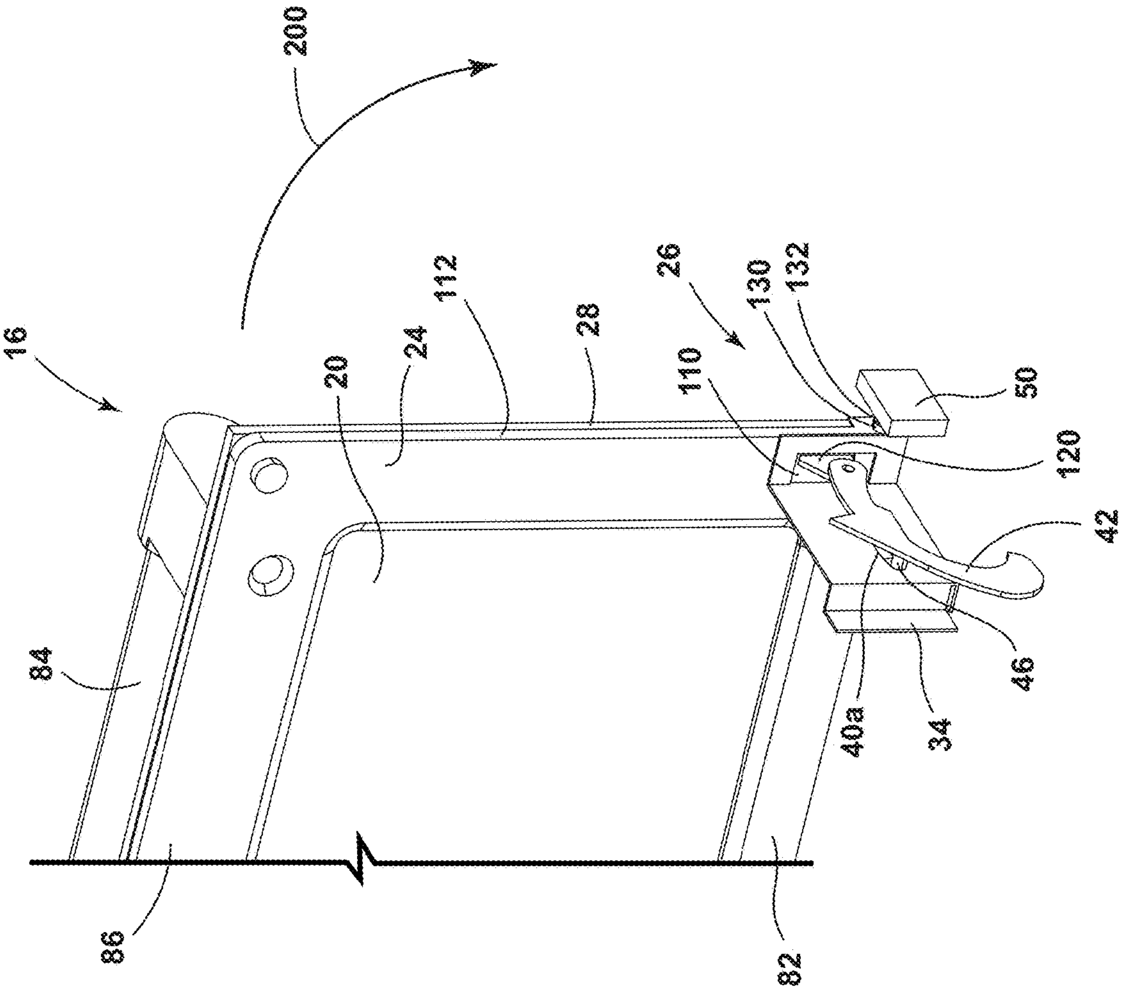
FIG. 11 is a partial rear perspective view of a door assembly having an adjustment assembly with the door assembly in a closed position, according to the present disclosure.
Figure 12:
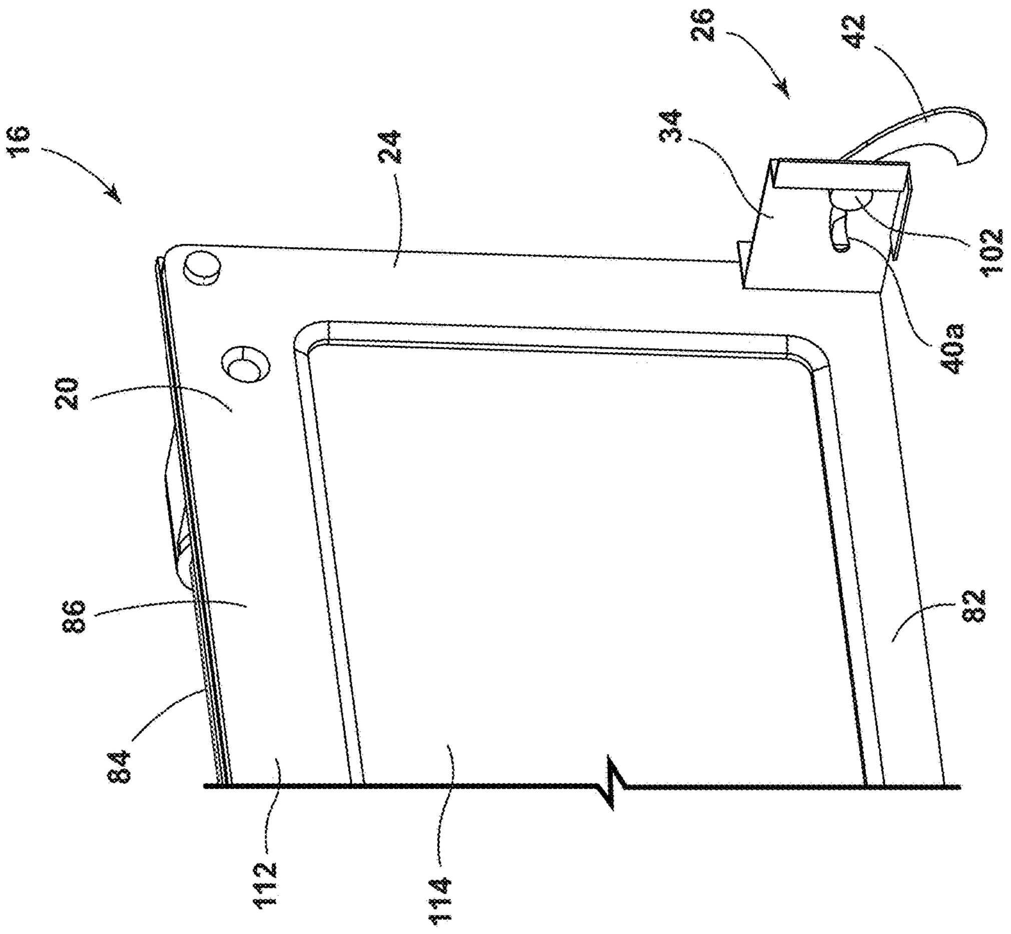
FIG. 12 is a partial rear perspective view of a door assembly having an adjustment assembly with the door assembly in a closed position, according to the present disclosure.

Referring still to FIG. 10, as well as to FIGS. 11 and 12, the motor 50 is disposed proximate to the support structure 34 on a same side as the link arm 42. The motor 50 includes the driveshaft 132, which may receive or otherwise engage the pin 130 of the door 20 to drive movement thereof. The motor 50 is positioned along the rotational axis 122 of the door 20. The motor 50 is configured to drive the door 20 from the opened position 22 to the closed position 24, from the closed position 24 to the opened position 22, or a combination thereof. In a non-limiting example, the motor 50 is configured to rotate the driveshaft 132 in a first direction to move the door 20 in along a first movement path 200. In an additional non-limiting example, the motor 50 is configured to rotate the driveshaft 132 in the first direction to move the door 20 along the first movement path 200 and a second direction to move the door 20 along a second movement path 202.

Referring still to FIGS. 11 and 12, when the door 20 is in the closed position 24, the interior surface 48 of the door 20 is configured to abut an outer surface 204 of the frame 18 (see FIG. 3). The flange 120 extends through the aperture 110 defined in the first end portion 150 of the support structure 34, 36 to engage with the coupling portion 172 of the link arm 42. The link arm 42 is rotatably coupled to the flange 120 to allow the door 20 to rotate relative to the link arm 42. Additionally, when the door 20 is in the closed position 24, the projection 46 extends through the slot 40*a* at the distal end 162 adjacent to the second end portion 152 of the support structure 34.

Figure 13:
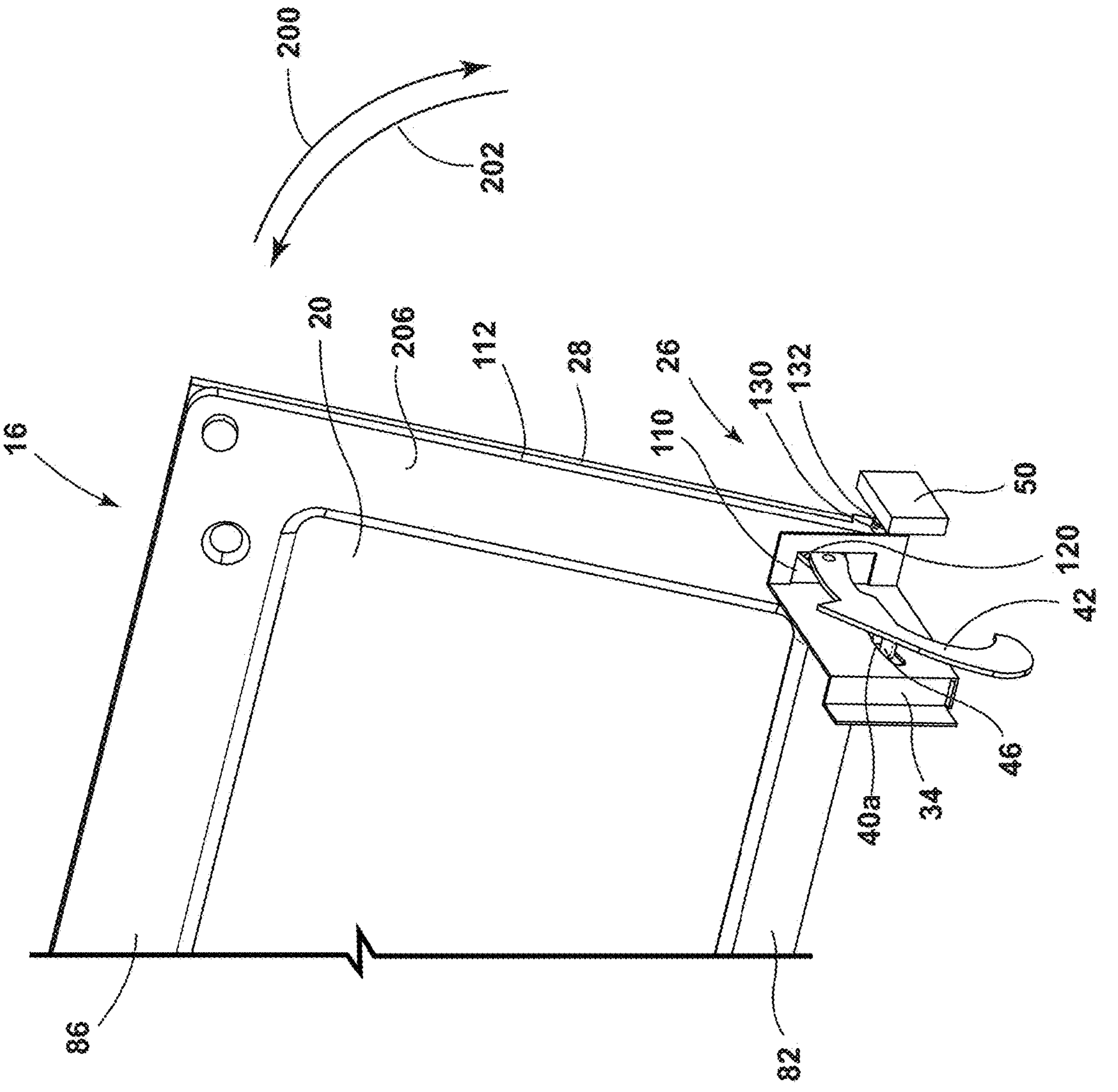
FIG. 13 is a partial rear perspective view of a door assembly having an adjustment assembly with the door assembly in a partially opened position, according to the present disclosure.
Figure 14:
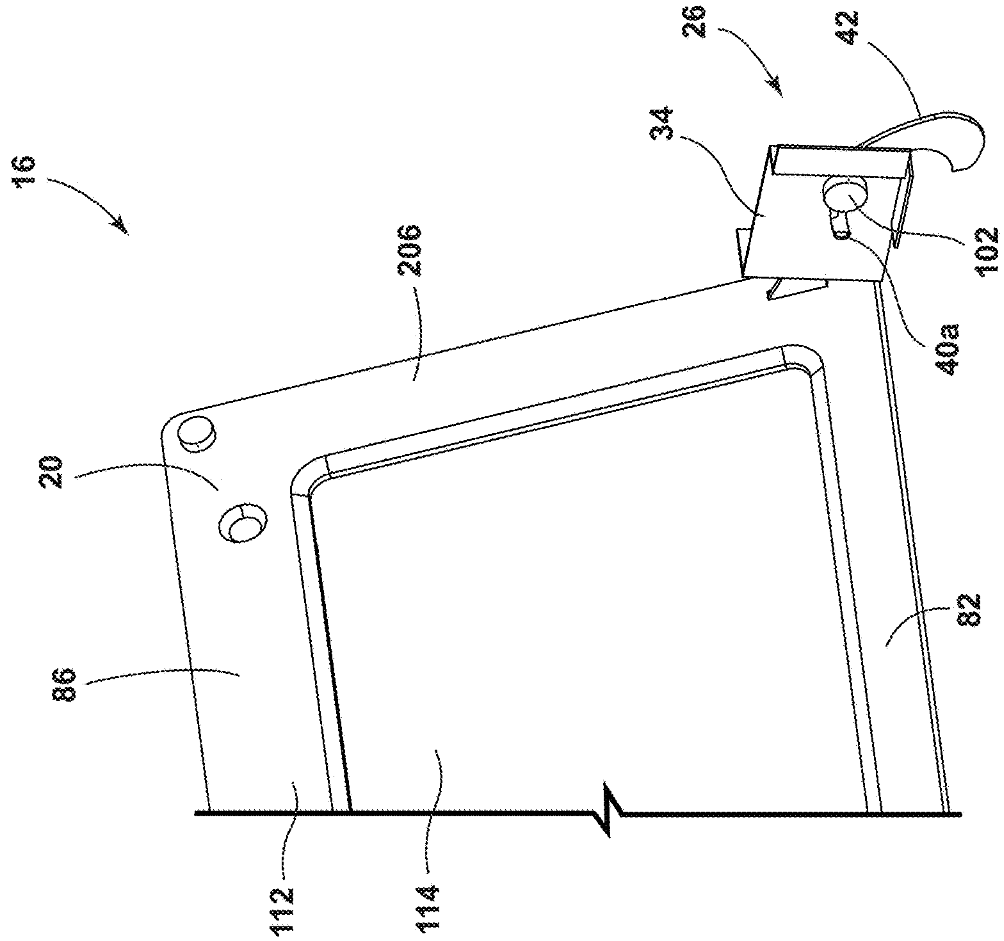
FIG. 14 is a partial side perspective view of a door assembly having an adjustment assembly with the door assembly in a partially opened position, according to the present disclosure.

Referring to FIGS. 13 and 14, as the door 20 is adjusted to a partially opened position 206, the door 20 is rotated about the rotational axis 122 by at least one of the motors 50, 52 driving the door 20 through the engagement between the driveshaft 132 and the pin 130. The door 20 rotates away from the support structure 34, which draws the link arm 42 forward and through the aperture 110 of the support structure 34, 36 and the aperture 100 of the frame 18. As the link arm 42 is being drawn forward, the projection 46 travels along the curved guide path 170 away from the distal end 162 of the slot 40*a*. In the illustrated example, the projection 46 travels slightly up a slope toward an apex of the curve defined by the slot 40*a*.

Figure 15:
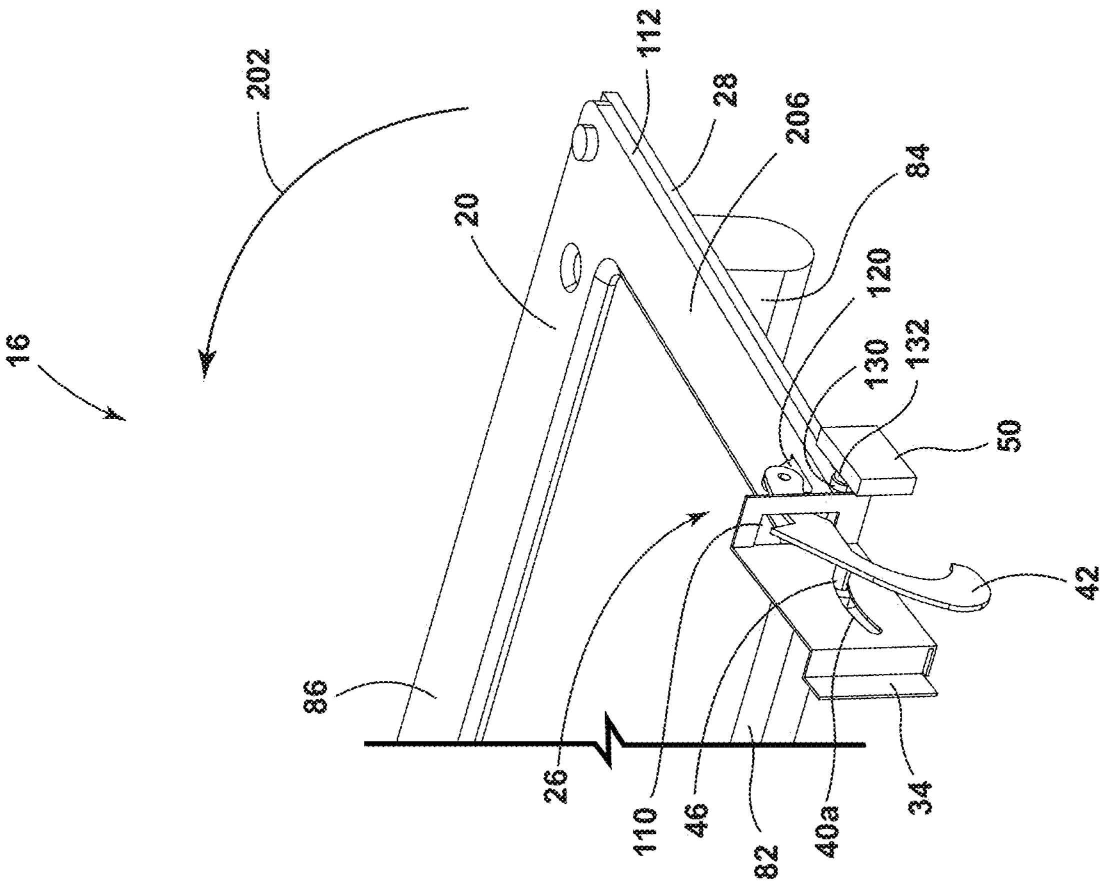
FIG. 15 is a partial rear perspective view of a door assembly having an adjustment assembly with the door assembly in a fully opened position, according to the present disclosure.
Figure 16:
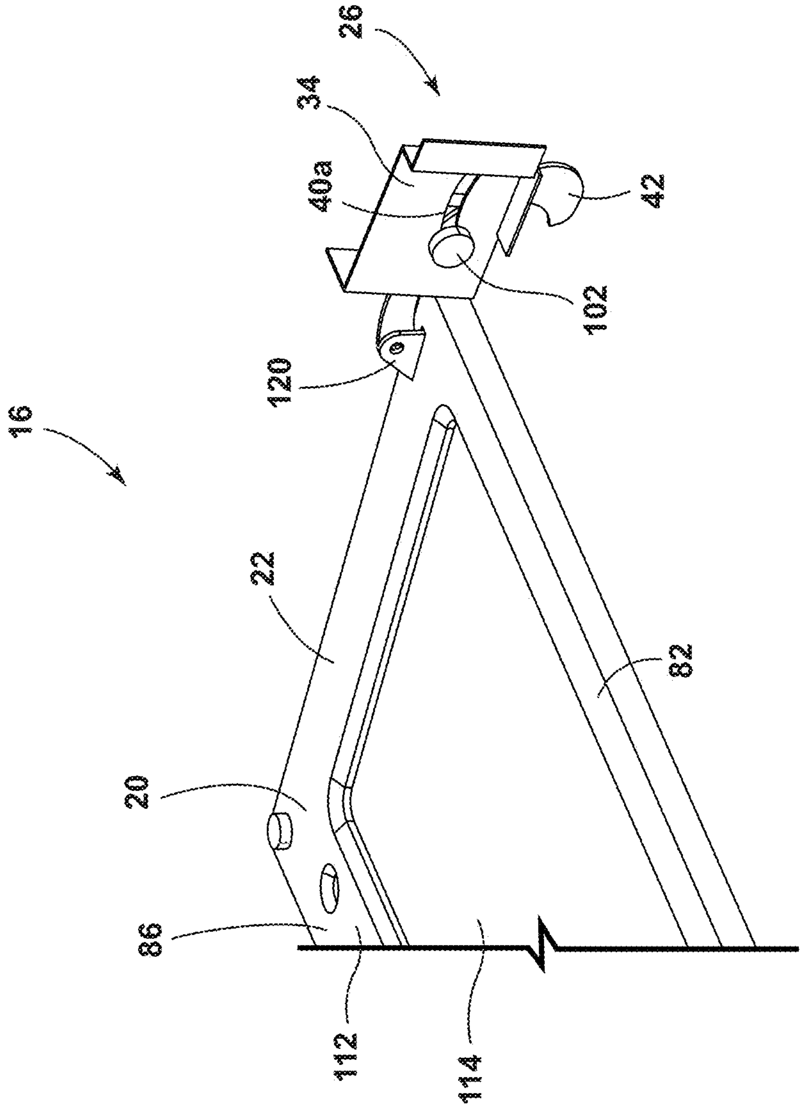
FIG. 16 is a partial side perspective view of a door assembly having an adjustment assembly with the door assembly in a fully opened position, according to the present disclosure.
Figure 17:
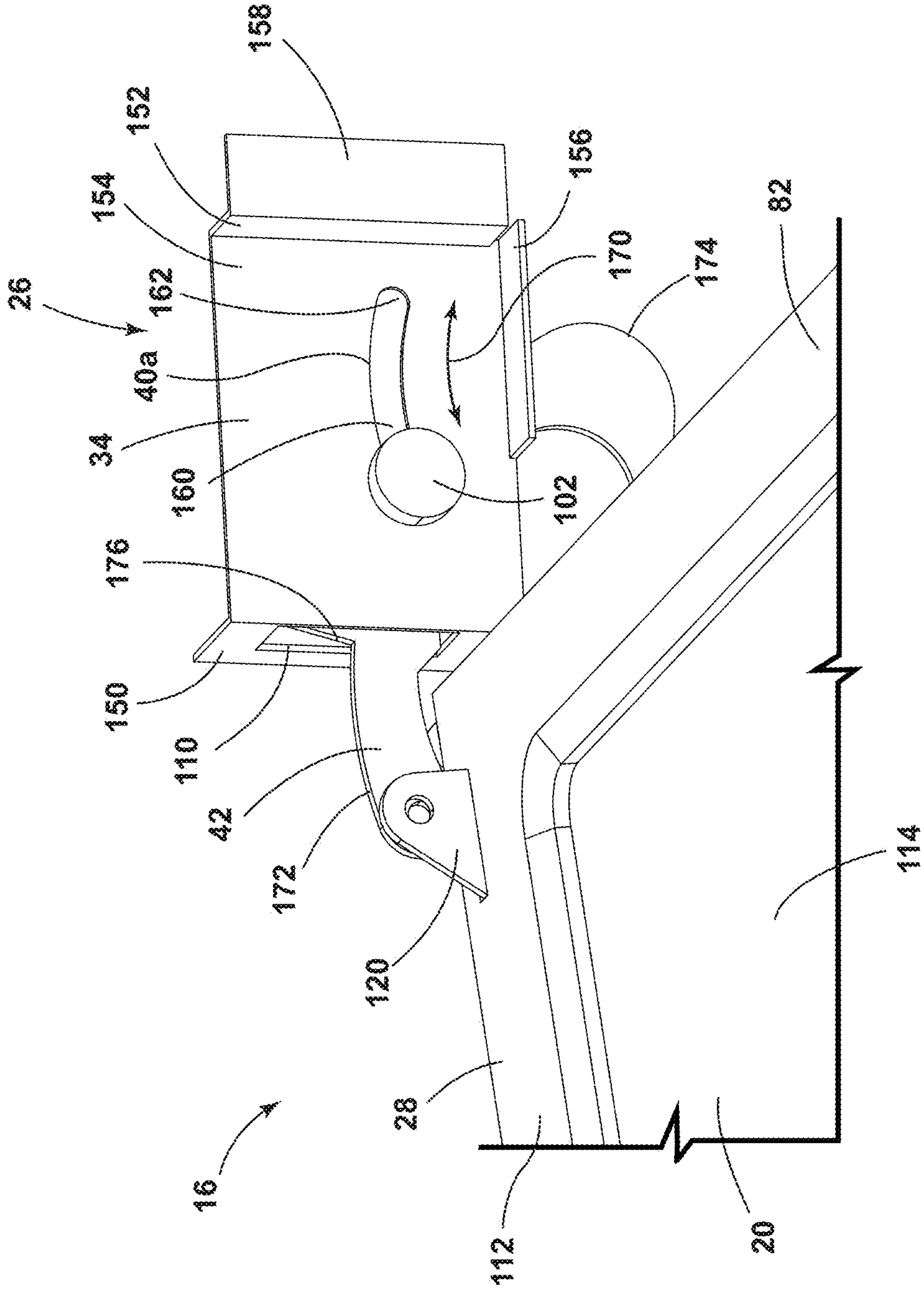
FIG. 17 is a side perspective view of an adjustment assembly coupled to a door where the door is in a fully opened position, according to the present disclosure.

Referring to FIGS. 15-17 when the door 20 is in the fully opened position 22. The door 20 extends generally horizontal and the flange 120 extends generally vertical. The door 20 draws the link arm 42 further through the apertures 100, 110, which draws the projection 46 toward the proximal end 160 of the slot 40*a*. After reaching the apex, the projection 46 may generally move at a downward angle along the slope to the proximal end 160. The projection 46 may abut the guide plate 154 to define the fully opened position 22 of the door 20 and stop further movement.

The movement of the link arm 42 causes the vertical protrusions 176, 178 to be moved closer to the first end portion 150. In certain aspects, when the door 20 is in the fully opened position 22, the coupling portion 172 may be disposed on one side of the first end portion 150, while the guide portion 174 is on the opposing side of the first end portion 150. The vertical protrusions 176, 178 are generally positioned within or adjacent to the aperture 110 in the first end portion 150, which may obscure the view into the interior of the cooking appliance 10. It is contemplated that the vertical protrusions 176, 178 may also act as stop features engaging the end portion 150 when the door 20 is fully opened.

Referring to FIGS. 1-17, while the first adjustment assembly 26 is described in greater detail herein, it is contemplated that the second adjustment assembly 30 is configured to be arranged and function in a substantially similar manner. The first and second adjustment assemblies 26, 30 are arranged on opposing sides of the door 20 to guide and drive movement on both sides 28, 32. In the illustrated example, the link arms 42, 44 are disposed on an outer side of the support structures 34, 36 proximate to the body 12, while the retaining caps 102, 104 are disposed on inner sides of the support structures 34, 36 proximate to the cooking cavity 72. Other configurations of the adjustment assemblies 26, 30 are contemplated without departing from the teachings herein. For example, the link arms 42, 44 may be disposed on the inner side of the support structures 34, 36 while the retaining caps 102, 104 are on the outer side. The adjustment assemblies 26, 30 guide the movement of the door 20 as the projections 146 travel along the guide path 170 defined by the slots 40*a*, 40*b*. One or both of the motors 50, 52 are utilized to adjust the door 20 between the opened and closed positions 22, 24 as described further herein.

Figure 18:
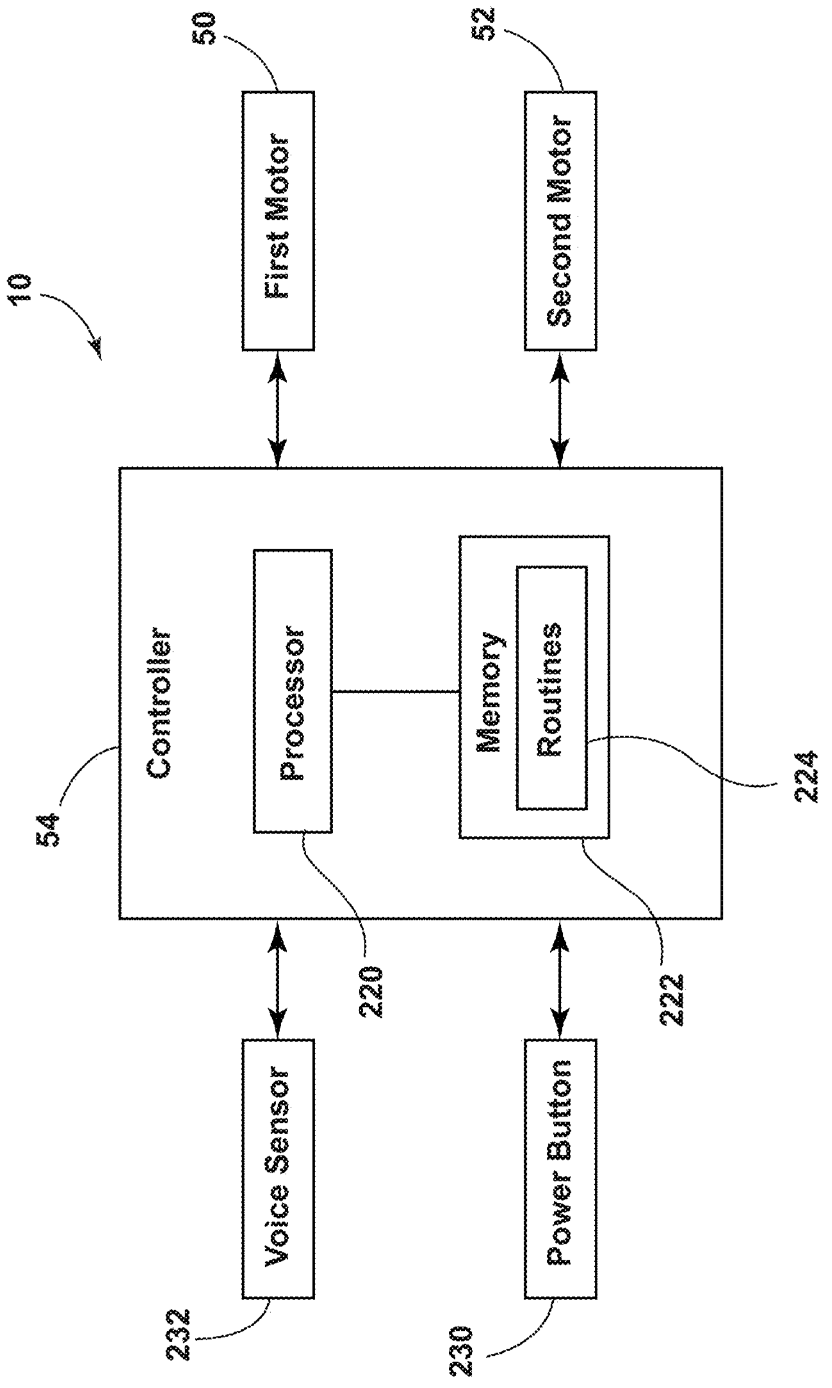
FIG. 18 is a block diagram of a countertop cooking appliance with automated door adjustment assemblies, according to the present disclosure.

Referring to FIG. 18, as well as FIGS. 1-17, the cooking appliance 10 includes the controller 54 having a processor 220, a memory 222, and other control circuitry. Instructions or routines 224 are stored in the memory 222 and executable by the processor 220. The controller 54 is in communication with the motors 50, 52 of the first adjustment assembly 26 and the second adjustment assembly 30, respectively. The controller 54 may selectively and independently activate or deactivate the motors 50, 52 depending on a variety of factors, such as the routines 224, a current position of the door 20, a subsequent position of the door 20, etc.

The controller 54 disclosed herein may include various types of control circuitry, digital or analog, and may include the processor 220, a microcontroller, an application specific circuit (ASIC), or other circuitry configured to perform the various input or output, control, analysis, or other functions described herein. The memory 222 described herein may be implemented in a variety of volatile and nonvolatile memory formats. The routines 224 include operating instructions to enable various functions described herein.

The controller 54 is in communication with a power button 230, which is illustrated in FIG. 1 on the frame 18 but may be located in any practicable location. The power button 230 may be positioned on the body 12, on a user interface, other locations on the cooking appliance 10. The user may press, touch, or otherwise select the power button 230 to activate the cooking appliance 10. Activating the cooking appliance 10 may turn the cooking appliance 10 to an "ON" state from an "OFF" state. The power button 230 may also activate the cooking appliance 10 from a "SLEEP" or "STANDBY" state to the "ON" state. This activation may be a primary activation of the cooking appliance 10.

The cooking appliance 10 also includes a sensor 232, which is illustrated in FIG. 1 on the frame 18 above the door 20 but may be positioned in any practicable location. Once the cooking appliance 10 is activated, the controller 54 activates the sensor 232 to receive a secondary activation of the cooking appliance 10. The secondary activation may be an activation of the door assembly 16. The sensor 232 defines a sensing field 234 that generally extends forward of the cooking appliance 10. The sensor 232 is configured to sense an activation signal within the sensing field 234.

In a non-limiting example, the sensor 232 may be configured as a proximity sensor. In such examples, the sensor 232 is configured to sense a presence of the user within the sensing field 234, which is the activation signal. In another non-limiting example, the sensor 232 may be configured as a gesture sensor, and the activation signal may be a gesture. In such examples, the controller 54 may be able to distinguish different sensed activation signals or gestures. For example, a first gesture may be utilized for opening the door 20 and a second gesture may be utilized for closing the door 20. In an additional non-limiting example, the sensor 232 may be configured as a voice sensor and the activation signal may be a voice command. In such configurations, the controller 54 may be configured to control the cooking appliance 10 in response to specific voice commands. The specific gestures and/or voice commands may be stored within the controller 54, allowing the controller 54 to distinguish various activation signals from one another.

Additionally or alternatively, the controller 54 may determine which direction to move the door 20 based on the current position of the door 20. If the current position of the door 20 is in the closed position 24, the controller 54 may adjust the door 20 to the opened position 22 in response to the activation signal. Similarly, if the current position of the door 20 is the opened position 22, the controller 54 may adjust the door 20 to the closed position 24.

Referring still to FIGS. 1-18, once the sensor 232 senses the activation signal, the controller 54 is configured to activate at least one of the motors 50, 52. In various examples, both motors 50, 52 may be activated to adjust the door 20. In such examples, both motors 50, 52 are utilized to adjust the door 20 from the closed position 24 to the opened position 22 and from the opened position 22 to the closed position 24. Accordingly, each motor 50, 52 is configured to rotate the respective driveshaft 132 in the first direction and the second direction to adjust the door 20 along both movement paths 200, 202.

In additional or alternative examples, one motor 50 may be activated at a time, while the other motor 52 may remain idle. In such examples, the motor 50, 52 which is activated may depend on the current position of the door 20. For example, the first motor 50 may be configured to drive the door 20 in the first direction to open the door 20 (e.g., along the first movement path 200), while the second motor 52 remains idle. The second motor 52 is then configured to drive the door 20 in the second direction (e.g., along the second movement path 202). In this way, one motor 50 is utilized to open the door 20, while the other motor 52 is utilized to close the door 20. The motors 50, 52 may each drive rotation in a single direction.

Referring still to FIGS. 1-18, the controller 54 may be configured to determine the current position of the door 20 to determine which motor 50 to activate and/or to deactivate the motors 50, 52. The motors 50, 52 may be configured as stepper motors 50, 52 and configured to send a position of the door 20. Additionally or alternatively, a position sensor or another similar feature may be utilized to determine the current position of the door 20.

Figure 19:
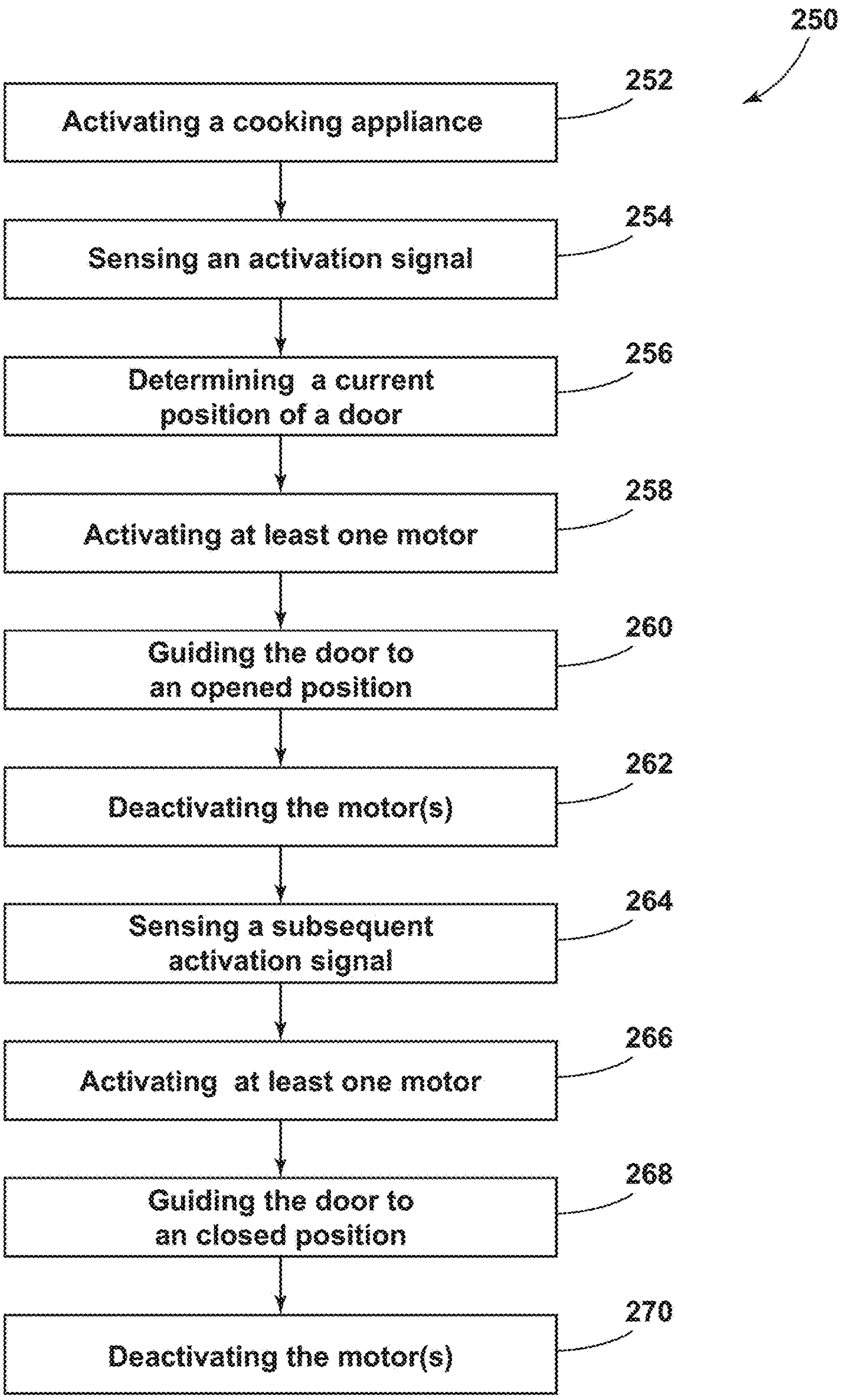
FIG. 19 is a flow diagram of a method of adjusting an appliance door, according to the present disclosure.

With reference to FIG. 19, as well as to FIGS. 1-18, a method 250 of adjusting the door 20 to the cooking appliance 10 includes step 252 of activating the cooking appliance 10 through the power button 230. Step 252 may cause the primary activation of the cooking appliance 10 to be in a "READY" state. When the "READY" or activated state, the sensor 232 may also be activated. In step 254, the sensor 232 is configured to sense the activation signal. The activation signal may include the presence of the user, the gesture, the voice command, a combination thereof, or other activation signals. In step 256, the controller 54 is configured to sense the current position of the door 20 through the motors 50, 52, the position sensor, etc.

In step 258, at least one of the motors 50, 52 of the adjustment assemblies 26, 30 is activated. Which motor 50, 52 that is activated may depend on the current position of the door 20. The motors 50, 52 are configured to adjust the door 20 from the current position to the subsequent position, which is different from the current position. For example, if the door 20 is in the closed position 24, the door 20 will be moved to the opened position 22, and if the door 20 is in the opened position 22, the door will be moved to the closed position 24.

In step 260, the door 20 is guided by moving the projections 46 of the link arms 42, 44 along the curved guide path 170 defined by the slots 40*a*, 40*b* in the support structures 36, 38. The projections 46 are configured to move from the distal end 162 to the proximal end 160 of the slots 40*a*, 40*b*, respectively. As the door 20 is rotated, the link arms 42, 44 are drawn forward through the support structures 34, 36 and the frame 18. As the link arms 42, 44 move, the projections 46 move along the curved guide paths 170 of the slots 40*a*, 40*b* to guide and control the movement of the door 20. In step 262, once the door 20 reaches the fully opened position 22, the activated motors 50, 52 are deactivated. The user may then insert or remove an item from the cooking cavity 72.

In step 264, the sensor 232 may sense a subsequent activation signal. The subsequent activation signal may be the same or different as the previous activation signal. In step 266, upon sensing the subsequent activation signal, at least one of the motors 50, 52 is activated to drive the door 20 to the closed position 24. The activation signals may be advantageous for providing more hands-free control of the door 20 of the cooking appliance 10. In step 268, as the door 20 is rotated, the link arms 42, 44 are pushed into the inner cavity 14 of the appliance. The projections 46 travel in the opposite direction along the slots 40*a*, 40*b*, which guides and controls the movement of the door 20 when closing. In step 270, the motors 50, 52 are deactivated. Additionally, the sensor 232 may stay in a "READY" or "STANDBY" state for a predefined period of time after the door 20 closes, during a cooking cycle, or a combination thereof. It is understood that the steps of method 250 may be performed in any order, simultaneously, and/or omitted without departing from the teachings provided herein.

Use of the present device may provide for a variety of advantages. For example, the adjustment assemblies 26, 30 may be coupled to each side 28, 32 of the door 20 to provide more control over the movement of the door 20 and minimize or prevent twisting. Additionally, the engagement between the projections 46 and the retaining caps 102, 104 may guide or control the movement of the door 20 between opened and closed positions 22, 24 based on the engagement between the link arms 42, 44 and the support structures 34, 36. Further, the retaining caps 102, 104 secured to the ends 134 of the projections 46 on the opposing side of the support structure 34, 36 relative to the link arms 42, 44 maintains the engagement between the link arms 42, 44 and the support structures 34, 36 as the door 20 moves. Moreover, the cooking appliance 10 may include the sensor 232, which may sense the activation signals causing activation of the motors 50, 52 and adjustment of the door 20. Also, the sensor 232 may be advantageous for providing hand-free control of the door 20, which may be advantageous when the user is holding the food item to be inserted into or that was removed from the cooking cavity 72. Moreover, the hands-free control may minimize heat that escapes from the cooking appliance 10 by quicker control of the door 20 when the user is holding the food item. Further, the sensor 232 provides the secondary activation, which controls the door assembly 16. Additional benefits or advantages may be realized and/or achieved.

The device disclosed herein is further summarized in the following paragraphs and further characterized by combinations of any and all the various aspects described therein.

According to another aspect of the present disclosure, a cooking appliance includes a body defining an inner cavity. A door assembly is coupled to the body. The door assembly includes a frame. A door is rotatably coupled to the frame. The door is operable between an opened position and a closed position. A first adjustment assembly is coupled to a first side of the door assembly. A second adjustment assembly is coupled to a second side of the door assembly. Each of the first adjustment assembly and the second adjustment assembly includes a support structure coupled to an inner surface of the frame and defining a slot. A link arm includes a projection. The link arm is coupled to an interior surface of the door and the projection extends through the slot. A motor is operably coupled to the door. A controller is in communication with the first adjustment assembly and the second adjustment assembly. The controller is configured to activate the at least one of the first adjustment assembly and the second adjustment assembly to guide the door between the opened position and the closed position.

According to another aspect, a controller is configured to activate a motor of a first adjustment assembly to move a door from an opened position to a closed position and activate a motor of a second adjustment assembly to move the door from the closed position to the opened position.

According to another aspect, a controller is configured to activate each of a motor of a first adjustment assembly and a motor of a second adjustment assembly to move a door from an opened position to a closed position and to move the door from the closed position to the opened position.

According to another aspect, pins are positioned on each side of a door proximate to a rotational axis. The pins are configured to engage a driveshaft of motors, respectively.

According to another aspect, a sensor defines a sensing field that extends forward from a countertop appliance. The sensor is configured to sense an activation signal within the sensing field. A controller is configured to activate at least one motor in response to the activation signal.

According to another aspect, an activation signal is at least one of a user presence, a gesture, and a voice command.

According to another aspect, each of a first adjustment assembly and a second adjustment assembly includes a retaining cap that couples to an end of a projection of a respective link arm.

According to another aspect, each projection defines threads and each retaining cap defines mating threads configured to engage the threads on the respective projection.

According to another aspect, a door assembly for a countertop cooking appliance includes a frame defining an opening. A door is rotatably coupled to the frame and operable about a rotational axis between an opened position and a closed position for selectively accessing the opening. A support structure is coupled to an inner surface of the frame. The support structure defines a slot having a proximal end and a distal end. A link arm is rotatably coupled to an interior surface of the door. The link arm includes a projection extending through the slot. A cap is coupled to the projection on an opposing side of the support structure relative to the link arm. A motor is coupled to the door proximate to the rotational axis. A controller is in communication with the motor. The controller is configured to activate the motor to rotate the door. Movement of the door is guided by the projection traveling along the slot between the proximal end and the distal end.

According to another aspect, a pin extends from a door proximate to a rotational axis. A motor includes a driveshaft that engages the pin to drive movement of the door.

According to another aspect, a sensor is in communication with a controller. The sensor is configured to sense an activation signal. The controller is configured to activate 1 motor in response to the activation signal.

According to another aspect, a door includes a flange extending from an interior surface thereof. The flange extends through an aperture defined by a support structure to engage a link arm when the door is in a closed position.

According to another aspect, a support structure includes a first end portion coupled to a frame, a second end portion spaced from a first end portion, and a guide plate extending between the first end portion and the second end portion. A slot is defined in the guide plate.

According to another aspect, a first end portion extends in a first direction from a first end of a guide plate and a second end portion extends in a second direction from a second end of the guide plate.

According to another aspect, a projection is centrally positioned on a link arm proximate to vertical protrusions.

According to another aspect, a slot defines a curved shape to form a curved guide path.

According to another aspect, a projection defines threads and a cap defines mating threads to engage the threads of the projection.

According to another aspect, a method for adjusting an appliance door includes activating a countertop appliance and sensing an activation signal within a sensing field to adjust a door. The activation signal is at least one of a presence, a gesture, and a voice command. The method also includes determining a current position of the door; activating at least one motor to adjust the door to a subsequent position different than the current position and guiding the door by moving a projection of a link arm from along a slot defined in a support structure. The projection is configured to move from one end of the slot to an opposing end of the slot to control movement of the door.

According to another aspect, at least one motor includes a first motor and a second motor. A step of activating at least one motor includes activating the first motor when a current position is an opened position and activating the second motor when the current position is a closed position.

According to another aspect, a step of guiding a door by moving a projection includes moving the projection along a curved guide path.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes, and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A cooking appliance, comprising:
- a body defining an inner cavity;
- a door assembly coupled to the body, wherein the door assembly includes:
  - a frame; and
  - a door rotatably coupled to the frame, wherein the door is operable between an opened position and a closed position;
- a first adjustment assembly coupled to a first side of the door assembly, the first adjustment assembly including:
  - a support structure coupled to an inner surface of the frame and defining a slot;
  - a link arm including a projection, wherein the link arm is coupled to an interior surface of the door and the projection extends through the slot; and
  - a motor operably coupled to the door;
- a second adjustment assembly coupled to a second side of the door assembly, wherein the second adjustment assembly includes:
  - a support structure coupled to the inner surface of the frame and defining a slot;
  - a link arm including a projection, wherein the link arm is coupled to the interior surface of the door and the projection extends through the slot; and
  - a motor operably coupled to the door;
- pins positioned on each side of the door proximate to a rotational axis, wherein the pins are configured to engage driveshafts of the motors, respectively; and
- a controller in communication with the first adjustment assembly and the second adjustment assembly, wherein the controller is configured to activate at least one of the first adjustment assembly and the second adjustment assembly to guide the door between the opened position and the closed position.

2. The cooking appliance of claim 1, wherein the controller is configured to activate the motor of the first adjustment assembly to move the door from the opened position to the closed position and activate the motor of the second adjustment assembly to move the door from the closed position to the opened position.

3. The cooking appliance of claim 1, wherein the controller is configured to activate each of the motor of the first adjustment assembly and the motor of the second adjustment assembly to move the door from the opened position to the closed position and to move the door from the closed position to the opened position.

4. The cooking appliance of claim 1, further comprising:
- a sensor defining a sensing field that extends forward from said cooking appliance, wherein the sensor is configured to sense an activation signal within the sensing field, and wherein the controller is configured to activate at least one of the motors in response to the activation signal.

5. The cooking appliance of claim 4, wherein the activation signal is at least one of a user presence, a gesture, and a voice command.

6. The cooking appliance of claim 1, wherein each of the first adjustment assembly and the second adjustment assembly includes a retaining cap that couples to an end of the projection of the respective link arm.

7. The cooking appliance of claim 6, wherein each projection defines threads and each retaining cap defines mating threads configured to engage the threads on the respective projection.

8. A door assembly for a countertop cooking appliance, comprising:

a frame defining an opening;

a door rotatably coupled to the frame and operable about a rotational axis between an opened position and a closed position for selectively accessing the opening;

a support structure coupled to an inner surface of the frame, wherein the support structure defines a slot having a proximal end and a distal end;

a link arm rotatably coupled to an interior surface of the door, wherein the link arm includes a projection extending through the slot;

a cap coupled to the projection on an opposing side of the support structure relative to the link arm;

a motor coupled to the door proximate to the rotational axis; and a controller in communication with the motor, wherein the controller is configured to activate the motor to rotate the door, and wherein movement of the door is guided by the projection traveling along the slot between the proximal end and the distal end.

9. The door assembly of claim 8, further comprising:

a pin extending from the door proximate to the rotational axis, wherein the motor includes a driveshaft that engages the pin to drive the movement of the door.

10. The door assembly of claim 8, further comprising:

a sensor in communication with the controller, wherein the sensor is configured to sense an activation signal, and wherein the controller is configured to activate the motor in response to the activation signal.

11. The door assembly of claim 8, wherein the door includes a flange extending from the interior surface thereof, and wherein the flange extends through an aperture defined by the support structure to engage the link arm when the door is in the closed position.

12. The door assembly of claim 8, wherein the support structure includes a first end portion coupled to the frame, a second end portion spaced from the first end portion, and a guide plate extending between the first end portion and the second end portion, wherein the slot is defined in the guide plate.

13. The door assembly of claim 12, wherein the first end portion extends in a first direction from a first end of the guide plate and the second end portion extends in a second direction from a second end of the guide plate.

14. The door assembly of claim 8, wherein the projection is centrally positioned on the link arm proximate to vertical protrusions.

15. The door assembly of claim 8, wherein the slot defines a curved shape to form a curved guide path.

16. The door assembly of claim 8, wherein the projection defines threads and the cap defines mating threads to engage the threads of the projection.

17. A countertop appliance, comprising:

a body defining an inner cavity;

a door assembly coupled to the body, wherein the door assembly includes:

a frame; and a door rotatably coupled to the frame, wherein the door is operable between an opened position and a closed position;

a first adjustment assembly coupled to a first side of the door assembly, the first adjustment assembly including:

a support structure coupled to an inner surface of the frame and defining a slot;

a link arm including a projection, wherein the link arm is coupled to an interior surface of the door and the projection extends through the slot;

a motor operably coupled to the door; and a retaining cap that couples to an end of the projection of the link arm;

a second adjustment assembly coupled to a second side of the door assembly, wherein the second adjustment assembly includes:

a support structure coupled to the inner surface of the frame and defining a slot;

a link arm including a projection, wherein the link arm is coupled to the interior surface of the door and the projection extends through the slot; and a motor operably coupled to the door; and a retaining cap that couples to an end of the projection of the link arm; and a controller in communication with the first adjustment assembly and the second adjustment assembly, wherein the controller is configured to activate at least one of the first adjustment assembly and the second adjustment assembly to guide the door between the opened position and the closed position.

18. The countertop appliance in claim 17, wherein the slot of the first adjustment assembly and the slot of the second adjustment assembly are each a parabolic shape.

19. The countertop appliance in claim 17, wherein the link arm of the first adjustment assembly and the link arm of the second adjustment assembly travel in a parallel direction with respect to the support structure of the first adjustment assembly and the support structure of the second adjustment assembly, respectively, when the door adjusts between the opened position and the closed position.

20. The countertop appliance in claim 17, further comprising:

a sensor defining a sensing field, wherein the sensor is configured to sense an activation signal within the sensing field, and wherein the controller is configured to activate at least one of the motors in response to the activation signal.

* * * * *